(12) United States Patent
Hanemaaijer et al.

(10) Patent No.: US 6,716,355 B1
(45) Date of Patent: Apr. 6, 2004

(54) METHOD FOR THE PURIFICATION OF A LIQUID BY MEMBRANE DISTILLATION, IN PARTICULAR FOR THE PRODUCTION OF DESALINATED WATER FROM SEAWATER OR BRACKISH WATER OR PROCESS WATER

(75) Inventors: Jan Hendrik Hanemaaijer, Oosterbeek (NL); Jan Willem Van Heuven, Apeldoorn (NL)

(73) Assignee: Nederlands Organisatie voor Toegepast-Natuurwetenshappelijk Onderzoek TNO, Delft (NL)

( * ) Notice: Subject to any disclaimer, the term of this patent is extended or adjusted under 35 U.S.C. 154(b) by 0 days.

(21) Appl. No.: 09/979,893
(22) PCT Filed: May 26, 2000
(86) PCT No.: PCT/NL00/00366
§ 371 (c)(1), (2), (4) Date: Mar. 13, 2002
(87) PCT Pub. No.: WO00/72947
PCT Pub. Date: Dec. 7, 2000

(30) Foreign Application Priority Data

May 27, 1999 (NL) ............................................. 1012167

(51) Int. Cl.⁷ ............................................. B01D 61/36
(52) U.S. Cl. ........................... 210/640; 203/10; 203/22; 203/25; 210/650; 210/774
(58) Field of Search ................................. 210/637, 640, 210/641, 650, 651, 652, 774; 203/10, 11, 22, 25; 202/180, 202

(56) References Cited

U.S. PATENT DOCUMENTS 3,340,186 A * 9/1967 Weyl (List continued on next page.)

FOREIGN PATENT DOCUMENTS

DE 31 23 409 12/1982

(List continued on next page.)

OTHER PUBLICATIONS

Patent Abstracts of Japan, Publication No. 02014719, Publication Date Jan. 18, 1990, "Membrane Evaporation and Concentration Device", Inventor: Jun Kikuchi.

(List continued on next page.)

*Primary Examiner*—Joseph Drodge
(74) *Attorney, Agent, or Firm*—Browdy and Neimark, P.L.L.C.

(57) ABSTRACT

The following process steps are carried out in order to purify a liquid by membrane distillation, in particular to produce desalinated water from seawater or brackish water or process water:

passing a relatively warn vaporising stream of liquid (retentate stream) over a porous membrane, vapour flowing via the pores of the membrane to the other side of said membrane, and condensing said vapour on a relatively cool condenser surface to give a distillate stream, said condenser surface forming the non-porous separation between a feed stream to be purified and said distillate steam, which feed stream is in counter-current with the retentate stream so that an appreciable proportion of the latent heat will be transferred via vapour to the feed stream, and a gas gap with a width of less than 5 mm being present between the porous membrane and the condenser surface.

In order to improve the distillate flow rate per unit driving force, a pressure which is lower than the atmospheric pressure and higher than the vapor pressure of the feed stream is maintained in the gas gap, the porosity $\epsilon$ of the porous membrane is higher than 0.7, porosity being understood to be the ratio of the open volume to the total volume of the porous membrane, the surface area of the condenser surface is 1.2 to 6 times, preferably 2 to 3 times, the surface area of the porous membrane, the effective local vapour pressure difference between the retentate seam and the condensing stream is less than 10 kPa (0.1 bar), preferably less than 5 kPa (0.05 bar) and the perceptible heat of the distillate stream is released by heat exchange to the feed stream and/or the retentate stream, with preference for the retentate stream.

19 Claims, 6 Drawing Sheets

U.S. PATENT DOCUMENTS 3,563,880 A * 2/1971 Henderyckx
4,545,862 A * 10/1985 Gore et al. .................... 203/10
5,102,550 A * 4/1992 Pizzino et al. .............. 210/640

FOREIGN PATENT DOCUMENTS

| GB | 1225 254 | 3/1971 |
| JP | 60 227802 | 4/1986 |
| JP | 63 137705 | 6/1988 |
| JP | 1 148308 | 6/1989 |
| JP | 3 80920 | 4/1991 |
| JP | 11 101147 | 4/1999 |
| WO | 88 07585 | 12/1986 |
| WO | 96 17672 | 6/1996 |

OTHER PUBLICATIONS

Guijt et al., "Modelling of a transmembrane evaporation module for desalination of seawater", *Desalination*, (1999), vol. 126, pp. 119–125.

Kubota et al., "Experiments on Seawater Desalination by Membrane Distillation", *Desalination*, (1988), vol. 69, pp. 19–26.

* cited by examiner

METHOD FOR THE PURIFICATION OF A LIQUID BY MEMBRANE DISTILLATION, IN PARTICULAR FOR THE PRODUCTION OF DESALINATED WATER FROM SEAWATER OR BRACKISH WATER OR PROCESS WATER

REFERENCE TO RELATED APPLICATIONS

The present application is the national stage under 35 U.S.C. 371 of international application PCT/NL00/00366, filed May 26, 2000 which designated the United States, and which international application was published under PCT Article 21 (2) in the English language.

BACKGROUND OF THE INVENTION

The invention relates to a method for the purification of a liquid by membrane distillation, in particular for the production of desalinated water from seawater or brackish water or process water, comprising:

passing a relatively warm vaporising steam of liquid (retentate stream) over a porous membrane, vapour flowing via the pores of the membrane to the other side of said membrane, and condensing said vapour on a relatively cool condenser surface to give a distillate stream, said condenser surface forming the non-porous separation between a feed stream to be purified and said distillate steam, which feed stream is in counter-current with the retentate son o that an appreciable proportion of the latent heat will be transferred via vapour to the feed stream, and a gas gap with a width of less than 5 mm being present between the porous membrane and the condenser surface.

Membrane distillation differs from known distillation techniques such as multi-stage flash, multiple effect distillation and vapour compression in that a non-selective, porous membrane is used. This membrane forms a separation between the warm, vaporising retentate stream and the condensed product, the distillate stream. As a consequence of a suitable choice of material (usually polypropylene, polyethylene or polytetraflorethene), the pores (diameter of between 0.00001 and 0.005 mm, usually between 0.0001 and 0.0005 mm) are not wetted by the liquid; only vapour passes through the membrane.

Membrane distillation was first described in U.S. Pat. No. 3,334,186 from 1967. The intention was to improve the efficiency of seawater desalination by the use of an air-filled porous hydrophobic membrane The method concerned here was so-called direct contact membrane distillation: the warm seawater stream and the cold distillate stream are in direct contact with the membrane.

Substantial interest in membrane distillation was generated in the mid 1980s when a new generation of hydrophobic, highly porous membranes became available. However, research showed that membrane distillation is no less expensive than competitive techniques and therefore there was no commercial application.

A distinction can be made between four types of membrane distillation:

1. Direct contact membrane distillation (DCMD), where both the warm, vaporising stream and the cold condensate stream (distillate stream) are in direct contact with the membrane.
2. Air gap membrane distillation (AGMD), where the condenser surface is separated from the membrane by an air gap.
3. Sweeping gas membrane distillation, where the distillate is removed in vapour form by an inert gas.
4. Vacuum membrane distillation, where the distillate is removed in vapour form by vacuum. This method is described only for the removal of volatile components from aqueous streams and the point at issue is not the production of a liquid distillate.

Up to now direct contact membrane distillation has attracted the most attention.

U.S. Pat. No. 4,545,862 describes a spirally wound module (with flat membranes). This was seawater stream fed in counter-current to the vaporising retentate and the seawater stream thus effectively absorbed the heat of condensation. In this patent an example is described in which a relatively high flow rate of 5.3 liters per $m^2$ per hour is achieved with a temperture difference $\Delta T$ between the warm retentate and the seawater of 4° C., with an energy consumption of only 212 kiloJoule per kg distillate produced.

In addition to the use of flat membranes, the advantages of hollow fibre membranes for direct contact membrane distillation are known. As a result of the compact packing of membrane fibres, a surface area of up to 500 $m^2$ per $m^3$ can be obtained, which makes lower equipment costs possible. Furthermore, it has been proposed (see K. Schneider, T. J. van Gassel, Membrandestillation, Chem. Ing. Tech. 56 (1984) 514–521) to couple a direct contract membrane distillation module with a heat exchanger module in a cycle and thus to recover heat of condensation. It is found that for seawater desalination a distillate flow rate of approximately 8.5 liters per $m^2$ per hour is obtained for a $\Delta T$ of 14–16° C. and a specific energy consumption of above 1,000 kJ per kg water. Since 1984 there has been little discernable progress in the state of the art in respect of DCMD.

Air gap membrane distillation was first described in 1971 in British Patent Application GB 1 225 254 A (Henderyckx). In addition to the use of an air gap, counter-current flow of feed and retentate (and thus recovery of latent heat), is already proposed In addition, AGMD was described in 1982 in German Patent Application 3 123 409 (Siemens). This application relates to the use of a gap (with a thickness of 3 mm), filled with air, or optionally a lighter gas such as hydrogen, between a flat porous membrane and a cold condensation surface. The aim was to reduce the transport of perceptible heat by conduction through the membrane. It was established experimentally that heat transport by conduction was approximately equal to that by evaporation. Moreover, it was proposed to feed incoming seawater in counter-current to the vaporising stream and thus to recover heat. The use of solar heat as a source of heat was also claimed. A theoretical case was described in which a distillate flow rate of 3.36 kg per $m^2$ per hour was achieved with a temperature difference $\Delta T$ of 5° C., with a recovery of approximately 4.9% and an energy consumption of over 850 kJ per kilogram water produced.

European Patent Application 0 164 326 describes the use of an air gap with membrane distillation, the various features being constructed in the form of concentric tubes. A variant of this in which packets of flat membranes were used is described in the article Design and filed tests of a new membrane distillation desalination process (Desalination 56 (1985), pp. 345–354). It is striking that the principle of counter-current flow of seawater and retentate is abandoned, as a result of which no recovery of heat of evaporation is possible. Energy consumption figures are then also not given.

International Patent Application WO 8607585 A (1986) is based on the same model data but deduces from these that an air gap thickness of 0.2 to 1.0 mm is needed in order to achieve both a high flow rate and a low loss of perceptible heat (300 –800 kJ/kg water). No account is taken in the model of temperature falls at and in the hot and cold wall, as a result of which a far too optimistic picture is painted.

In U.S. Pat. No. 4,879,041 air gap membrane distillation is described specifically for the preparation of ultra-pure water for the semiconductor industry. Here the effect of the thickness of the air gap, when using flat membrane sheets, on mass transport and heat transport was investigated in the region between 3 and 10 mm. It was concluded from these investigations that transport is determined by diffusion at thicknesses of less than 5 mm and by free convection at thicknesses of more than 5 mm. The performances measured were moderate: maximum distillate flow rates of 3.6 kg per m² per hour for a vapour pressure difference of approximately 20 kPa Here again no heat of condensation is recovered and it is therefore also not surprising that a few years later there was a switch back to conventional multi-stage evaporation without membranes.

The attention paid to membrane distillation decreased in the 1990s and was in the main restricted to direct contact membrane distillation and to research into sweeping gas membrane distillation and vacuum membrane distillation for the removal and extraction of volatile components from aqueous streams.

On the basis of the literature, a system without an air gap is required for membrane distillation systems with a low energy consumption. On the basis of the prior art, it is not possible to achieve an energy consumption of less than 850 kJ per kg if an air gap is used or heat recovery is employed. This is related to high temperature differences ($\Delta T$ frequently to more than 40°) and consequently high driving forces (vapour press=re difference as a rule well above 15 kPa).

Direct contact membrane distillation systems are of simpler design and construction and in principle are less expensive than air gap membrane distillation systems and it can be seen from the prior art that the energy consumption is lower. Thus, in the light of the prior art the choice of air gap membrane distillation for inexpensive production of distilled water from seawater or brackish water is not obvious.

SUMMARY OF THE INVENTION

The aim of the invention is nevertheless to achieve a breakthrough in the performance (distillate flow rate per unit driving force) of air gap membrane distillation and thus appreciably to reduce both the costs and the energy consumption of membrane distillation systems. The aim is, in particular, to increase the performance by a factor of at least five to above 1 kg water per m² membrane surface area per hour per kPa vapour pressure difference and to do so in combination with a loss of perceptible heat of less than 240 kJ/kg water, or less than 10% of the latent heat.

In order to achieve this objective, the method mentioned in the preamble is characterised in that a pressure which is lower than the atmospheric pressure and higher than the vapour pressure of the feed stream is maintained in the gas gap, in that the porosity $\epsilon$ of the porous membrane is higher than 0.7, porosity being understood to be the ratio of the open volume to the total volume of the porous membrane, in that the surface area of the condenser surface is 1.2 to 6 times, preferably 2 to 3 times, the surface area of the porous membrane, in that the effective local vapour pressure difference between the retentate stream and the condensing stream is less than 10 kPa (0.1 bar), preferably less than 5 kPa (0.05 bar), and in that the perceptible heat of the distillate stream is released by heat exchange to the feed sun and for the retentate stream, with preference for the retentate stream. The perceptible heat loss of the retentate stream is less than 300 kJ/kg condensate (less than 12% of the latent heat) and the specific flow rate is higher than 0.5 kg (preferably higher than 1.0 kg) condensate/m² membrane/hour/kPa difference in water vapour pressure.

The relationship between the porosity $\epsilon$ of the membrane, the ratio S between condenser surface area and membrane surface area, the local vapour pressure difference D between retentate and feed, the width L of the gas gap in cm and the ratio P between the absolute pressure in the gas gap and the local water vapour pressure of the retentate is preferably as follows:

$$\frac{\epsilon.S^6}{D.L.P^2} > 1 (\text{preferably} > 2)$$

Known methods for AGMD and/or DCMD give a result of less than 0.5 (usually less than 0.1) for this relationship and also do not yield the desired performance.

When employing the method according to the invention, use can advantageously be made of a number of module segments connected to one another and each formed by a number of porous retentate channels, connected in parallel, which are separated by a gas gap and a non-porous membrane from feed steam channels which are positioned at an angle with respect to the retentate channels.

Said angle between the retentate and feed stream channels is between 10 and 170°.

The retentate channels are usually delimited by porous hydrophobic membranes (porosity greater than 70% and preferably greater than 80% and pore size larger than 0.1 $\mu$m, preferably between 0.3 and 1.0 $\mu$m). The membranes concerned can be commercially available membranes made of materials such as PTFE, PVDF, PP and PE and the like. So-called asymmetric microfiltration membranes made of materials such as polyethersulphone, polysulphone, polyacrylonitrile, polyamides, etc. can also be used. In this context it is preferable to make the surface of these membranes completely or partially additionally hydrophobic, for example by means of a coating or other surface modification. In the simplest embodiment the retentate channels consist of hollow fibres or capillary membranes placed in parallel. The retentate flows through the lumen of these fibres When asymmetric membranes are used the active layer of the membrane, with the narrowest pores, is on the retentate side.

In addition to hollow fibres, however, the retentate channels can also be formed by flat plate membranes or membrane sheets, optionally in a spirally wound configuration. In principle it is also possible for the retentate channels to be formed from hydrophilic material, such as threads or fabric, or for non-porous (but highly vapour-permeable) membranes to be used.

The condenser channels, through which the feed stream runs, are likewise preferably formed by hollow fibres/capillaries made of hydrophobic material, placed in parallel. These channels are now non-porous, that is to say are not vapour-permeable or are barely vapour-permeable. The discharge of the condensate distillate can take place via hydrophilic material (such as a fabric) that has been applied to or around these fibres. It is also possible to produce the condenser channels from hydrophilic material around which a film of distillate forms which, for example, can be discharged by gravity.

According to the invention the condenser surface area must be larger than the surface area of the retentate channels (1.2–6 times, preferably 2–3 times larger). This can be achieved by positioning the capillaries close to one another and/or by using multiple rows (as a rule two or three).

The width of the gap between the retentate channels and condenser channels, the so-called gas gap, can be defined by using a suitable spacer, preferably made of hydrophobic plastic. In order to restrict loss of perceptible heat from retentate to the feed by conduction through this material, the material must be highly porous (porosity preferably greater than 90%). The thickness of the material determines the width of the gas gap: less than 5 mm, preferably between 0.5 and 2 mm.

Preferably the gas gap is in particular filled with water vapour by producing a vacuum in the gas gap such that this vacuum is approximately equal to the vapour pressure of the retentate stream in situ in the module segment concerned. This gives the best performance with regard to mass transfer (water vapour transport from retentate to condenser) and limitation of the loss of perceptible heat. This vacuum can be produced by using a vacuum pump which operates on the bottom, and thus the coolest, module segment where the lowest assure will prevail, and by fitting resistances to flow, which may or may not be controllable, between all or some of the module segments. It is also possible for the condensate, possibly containing gases, to be discharged by means of a suction pump per module segment The gas gap can, however, also be at or around atmospheric pressure and filled with an inert gas, such as air or, preferably (in connection with the mass transfer and heat transfer), hydrogen or helium. Carbon dioxide, nitrogen and similar gases can also be used.

The process according to the invention can be implemented in a number of embodiment. Usually use will be made of cross-flow module segments equipped with hollow fibres for both the feed stream and the retentate stream. However, flat membrane sheets or plates, optionally in a spirally wound configuration, or plate-like structures consisting of multiple capillary-like channels to limit the flow channels can also be used for the retentate stream.

In a first embodiment of the method, the feed stream to be heated flows in virtually ideal counter-current to the vaporising retentate stream and the condensate distillate steam flows in co-current with the retentate stream and/or in counter-current to the feed stream, by which means the perceptible heat is also recovered.

In a variant of this, the retentate stream is alternately in heat exchange with a residual heat stream and the feed stream. This variant has the advantage that fill use is made of the residual heat and that the driving force at the inlet side of the feed stream is maintained by a rising temperature difference. The modules suitable for this can be of extra compact and inexpensive construction.

With this alternative embodiment it is possible for the retentate stream also to be brought into heat exchange with a stream of cooling water in accordance with the principle of the first embodiment of the method, an additional distillate stream being formed.

In a second variant the retentate stream is used, after it has been cooled by discharge of heat of evaporation to the feed stream, as a condenser by feeding this retentate stream through vapour-tight channels in cross-flow with the same retentate stream for cooling. The distillate stream is thus formed both by cooling by means of the feed strep and by cooling by means of the retentate stream.

The invention also relates to a module suitable for use with the method described above. Such a module is made up of a number of segments joined to one another, each segment consisting of layers of essentially parallel non-porous fibre membranes for the feed stream and layers of essentially parallel porous fibre membranes for the retentate stream, which porous fibre membranes are at an angle of between 10° and 170° to non-porous fibre membranes, a layer of porous fibre membranes being arranged between each two successive layers of non-porous fibre membranes, which layer of porous fibre membranes is held some distance away from the layers of non-porous fibre membranes by means of spacers, which distance is less than 5 mm. Each segment has a distribution chamber for feed liquid to be supplied, a distribution chamber located opposite the latter for feed liquid to be discharged, a distribution chamber for retentate to be supplied and a distribution chamber opposite the latter for retentate to be discharged.

BRIEF DESCRIPTION OF DRAWINGS

The invention will now be explained in more detail with reference to the figures.

In the figures the feed stream (for example seawater) is indicated by an arrow with a single arrowhead, the retentate stream by an arrow with a double arrowhead, the vapour stream by a broken-line arrow and the distillate stream (which is the condensate steam and is usually the product stream, for example desalinated water) by an arrow with a triple arrowhead. A porous membrane surface is shown as a broken line and a condenser surface as a solid line.

DETAILED DESCRIPTION OF THE INVENTION

Figure 1:
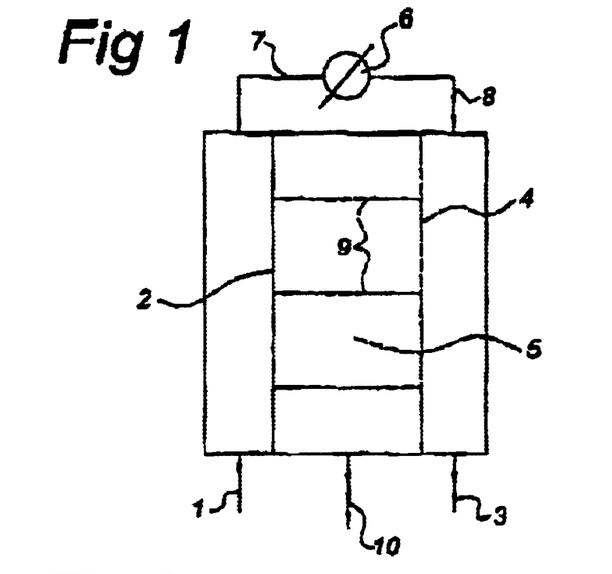
FIG. 1 shows, diagrammatically, a first embodiment of the method according to the invention.

In FIG. 1 a feed stream (for example seawater) delimited by a non-porous membrane 2 is indicated by 1 and a retentate stream delimited by a porous membrane 4 is indicated by 3.5 is a gas-filled gap between the non-porous membrane 2 and the porous membrane 4, 6 is a beat exchanger and 7 is a line for feeding the feed stream, which has been heated to some extent, to the heat exchanger 6. The retentate stream which has been heated inside the non-porous membrane 2 and in the beat exchanger is fed by means of a line 8 to the chamber delimited by the porous membrane 4.9 is a vapour stream that has flowed through the pores of the membrane 4 and 10 is a stream of liquid (for example desalinated water) that has condensed on the relatively cold membrane 2. The feed stream 1 and the retentate stream 2 flow in counter-current to one another. The same applies in the case of the feed stream 1 and the distillate/condensate/product stream 10. This latter counter-current flow leads to the recovery of so-called perceptible heat This can also (preferably) be effected by feeding stream 10 via heat exchangers in co-current with the retentate stream and optionally then with stream 1. The width of the gas gap is less than 5 mm.

The minimum amount of energy thermodynamically required to separate liquid pure water from seawater (35 g/liter salt) is approximately 3–15 MJ/m$^3$ for a recovery ranging from 0 to 100%. This implies that the energy consumption of desalination methods based on distillation is determined by the number of times that, and the exergy loss with which, the heat of vaporisation of water (approximately 2326 MJ/m) can be recovered. This is determined by the process circuit and by the requisite driving force for vaporisation/mass transport.

The specific energy consumption of such a process is mainly determined by the requisite driving force (heating of the stream to be vaporised), the heat absorption capacity of the stream to be vaporised and the loss of perceptible heat from retentate stream to the stream to be vaporised. Thus, it is in particular the mass transfer (this determines the requisite driving force), the heat transfer (especially of perceptible heat) and the process circuit/module design which are important.

It has been found that at least a minimum of ten module segments yield a virtually ideal counter-current flow. By use of the air gap (taking into account transport via the spacer) the total loss of heat (i.e. the transport of perceptible heat) can be restricted to less than 10% of that of latent heat (via mass transport). For a total mass transfer coefficient of 0.06 m/sec (values of up to 0.12 m/sec have been measured for permeation of water vapour through polypropylene hollow fibres) distillate flow rates of up to 7 l/m$^2$ hour are possible with temperature differences of less than or equal to 2° C. For a module constructed according to the invention with 10% perceptible heat loss, a heat balance for a temperature difference of 2° C. gives a heat recovery of 10.6% and a specific energy consumption of 82 MJ/m$^3$ (thermal capacity of seawater 4.2 MJ/m$^3$ K; vaporisation enthalpy 2326 MJ/m$^3$). It is extremely important in this context that perceptible beat is likewise recovered from the distillate stream; the module design makes it possible for the distillate to leave the module at a temperature equal to or lower than that of the retentate stream. The mass transfer can also be appreciably increased and the relative loss of perceptible heat further reduced by using vacuum in the module segments. This makes it possible to operate the modules according to the invention at a very low driving force (temperature difference) and thus with a low energy consumption.

Figure 2:
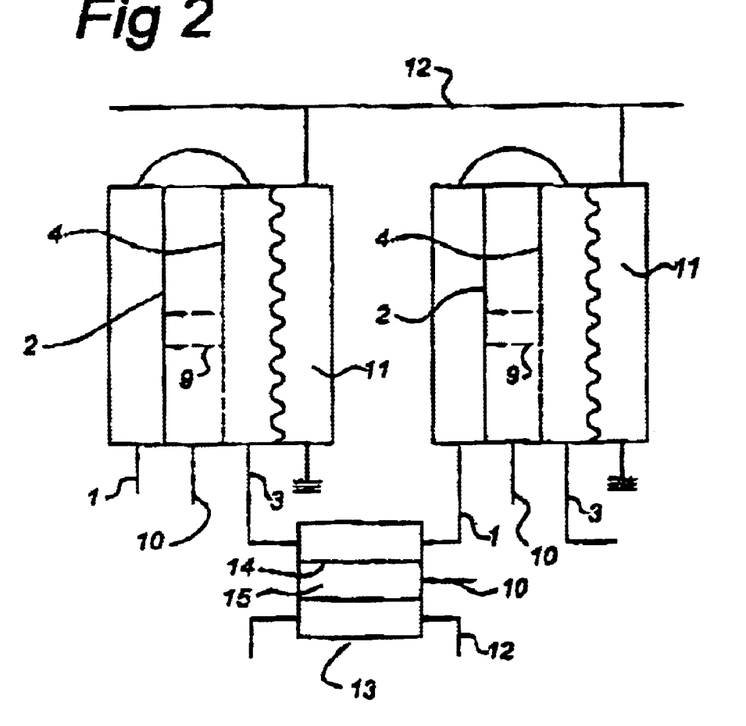
FIG. 2 shows, diagrammatically, a second embodiment (first variant) of the method according to the invention.

FIG. 2 shows a variant of the method described above with which residual heat (possibly after condensation) is available as liquid to be discharged. The heat is utilised not only for achieving the top temperature, but the liquid is cooled in heat exchange with the retentate stream to a temperature at which it can be discharged. A significant advantage is that fuller utilisation is made of the residual heat (exergy) and that the driving force at the bottom of the module is maintained by a rising temperature difference, as a result of which modules of this type can be of extra compact and inexpensive construction. Supplementing the embodiment according to FIG. 1, there is a flow channel 11 in which a relatively warm liquid supplied via line 12 is in heat exchange with the retentate stream 3. As is the case with the embodiment according to FIG. 1, this gives rise to a condensate stream 10. A number of modules constructed in this way can be placed in series and the retentate stream from the one module 3 is fed, after having been cooled by means of a cooling water stream 12 flowing in counter-current in a separate module 13 with a porous membrane 14 and a narrow gas gap 15, as feed stream 1 to a subsequent module in which residual heat is used in order to heat the retentate stream 3. The gas gap 15 is less than 5 mm. In this case a separate condensate steam 10 is also generated in the module in which cooling water is used as heat exchange medium.

Figure 3:
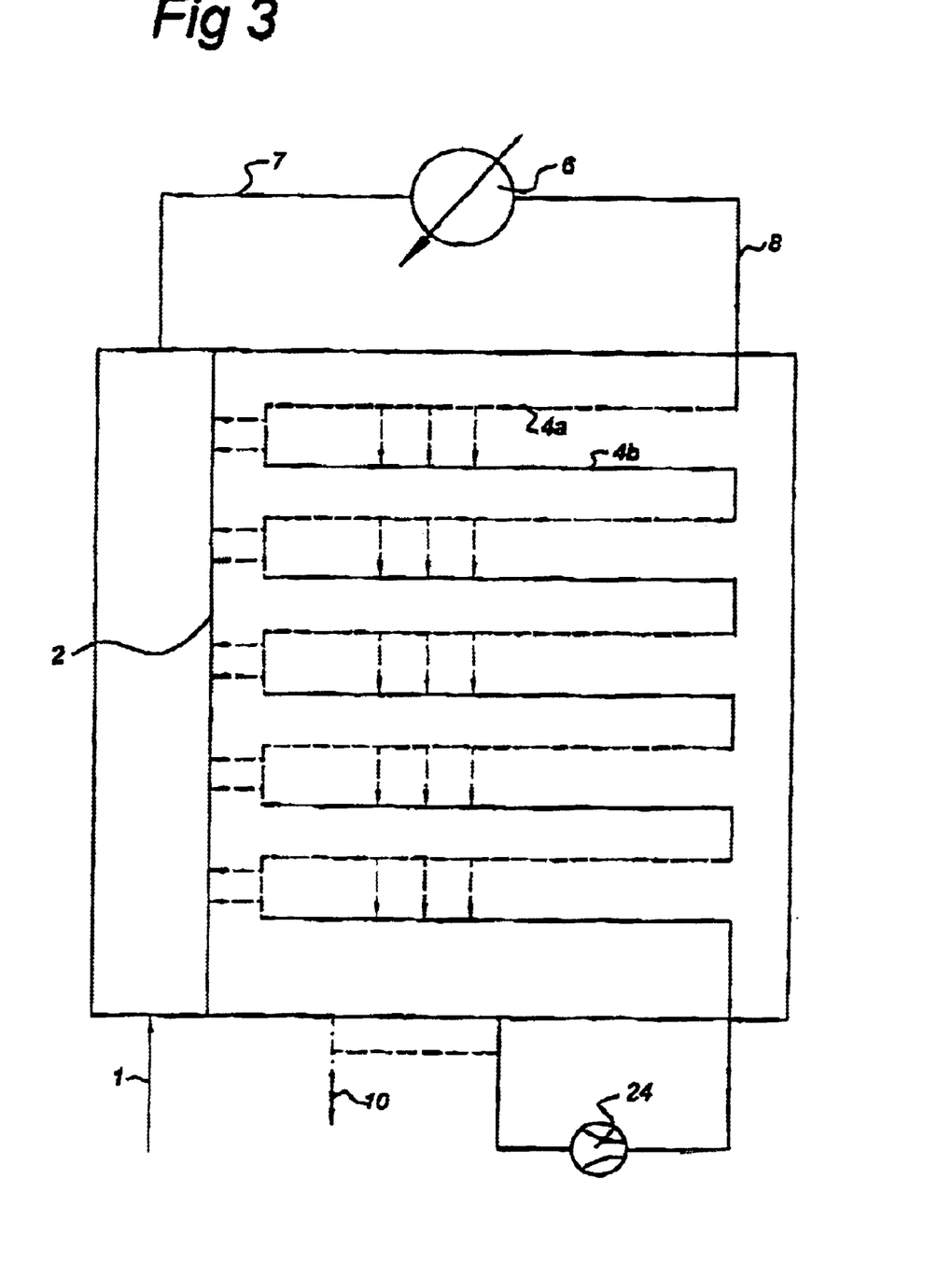
FIG. 3 shows, diagrammatically, a third embodiment (second variant) of the method according to the invention.

FIG. 3 shows, diagrammatically, a third embodiment in which pieces of porous retentate membranes 4a alternate with pieces of non-porous retentate membranes 4b and with which condensate is formed both close to the non-porous membranes 2 which delimit the feed stream 1 and on the non-porous parts 4b of the retentate membranes which delimit the retentate stream. Here too it is advantageous to generate vacuum in the module.

Figure 4:
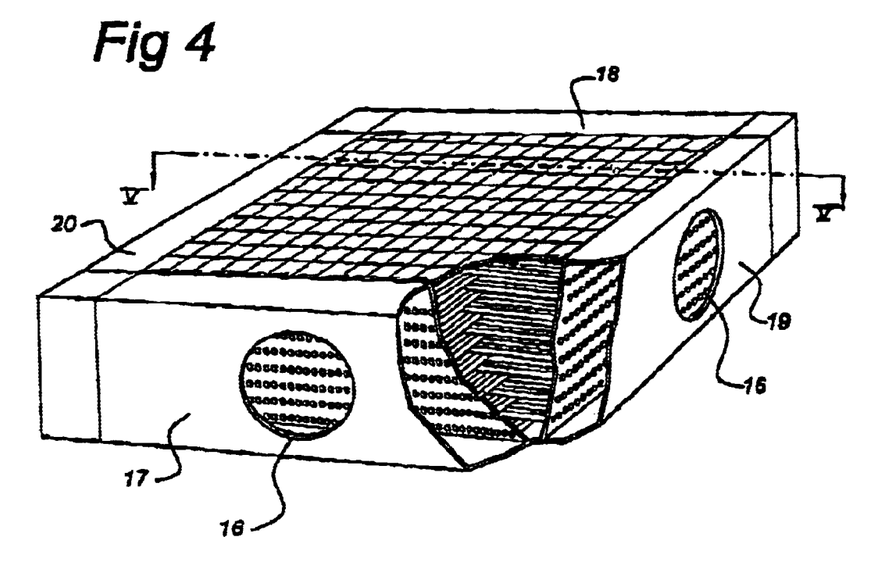
FIG. 4 shows the possible construction of a module segment to be used.
Figure 5:
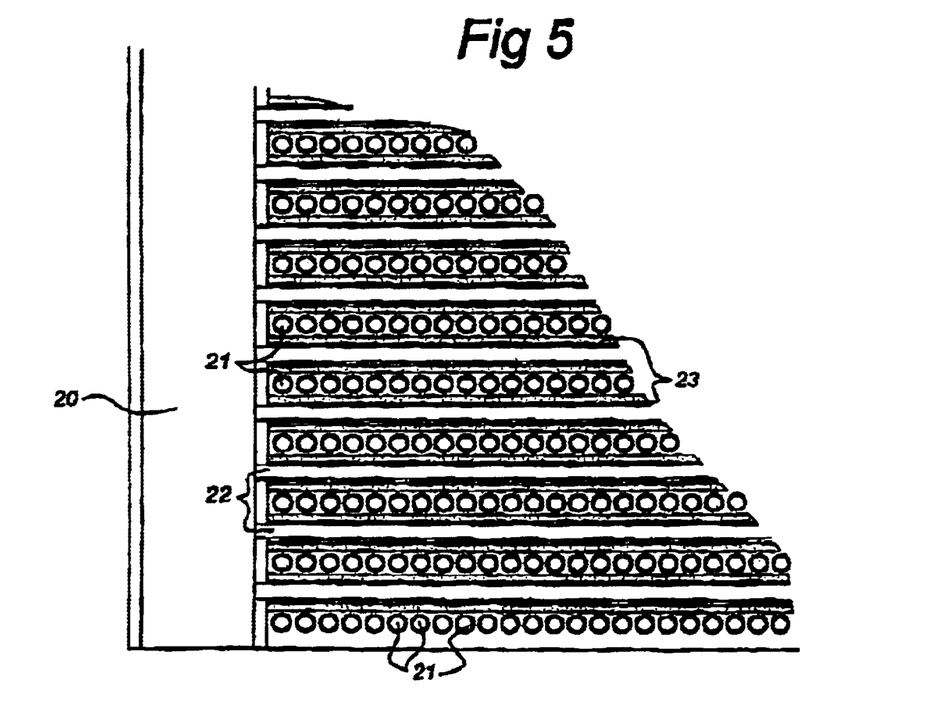
FIG. 5 shows a section along the line V—V in FIG. 4.

FIGS. 4 and 5 show an embodiment of a possible module segment to be used in the embodiment according to FIGS. 1, 2 and 3. The segment in this case consists of a square tube, the walls of which consist of chambers provided with an opening 16, that is to say a feed distribution chamber 17 for the relatively cold feed stream 1, a discharge distribution chamber 18, located opposite the latter, for the feed stream 1 that has been heated to some extent, a feed distribution chamber 19 for a warm retentate stream 3 and a discharge distribution chamber 20 for the retentate stream 3 that has been cooled to some extent. Layers of non-porous hollow fibres 21, in which the feed stream 1 flows from chamber 17 to chamber 18, extend between the chambers 17 and 18. The surface area of these fibres is larger (1.2 to 6 times and preferably 2 to 3 times larger) than that of the porous fibres or sheets 22. Incidentally, there could also be several layers (for example 2–4), in order to create an even larger condensation surface area. A layer of hollow porous fibres 22, in which the retentate stream 3 moves from the chamber 19 to the chamber 20, extends between each successive layer (or layers) of hollow fibres 21 .In the figure said hollow porous fibres 22 are at an angle of 90° to the hollow fibres 21, but this angle can be between 10 and 170°. Incidentally, a layer 22 can also be formed by an envelope of flat membrane, with a suitable spacer therein to hold the flow channel open The fibres 21 and 22 are held apart by a highly porous spacer layer or strip (porosity higher than 70%, preferably higher than 90%) filled with gas (for example water vapour or inert gas).

Figure 6:
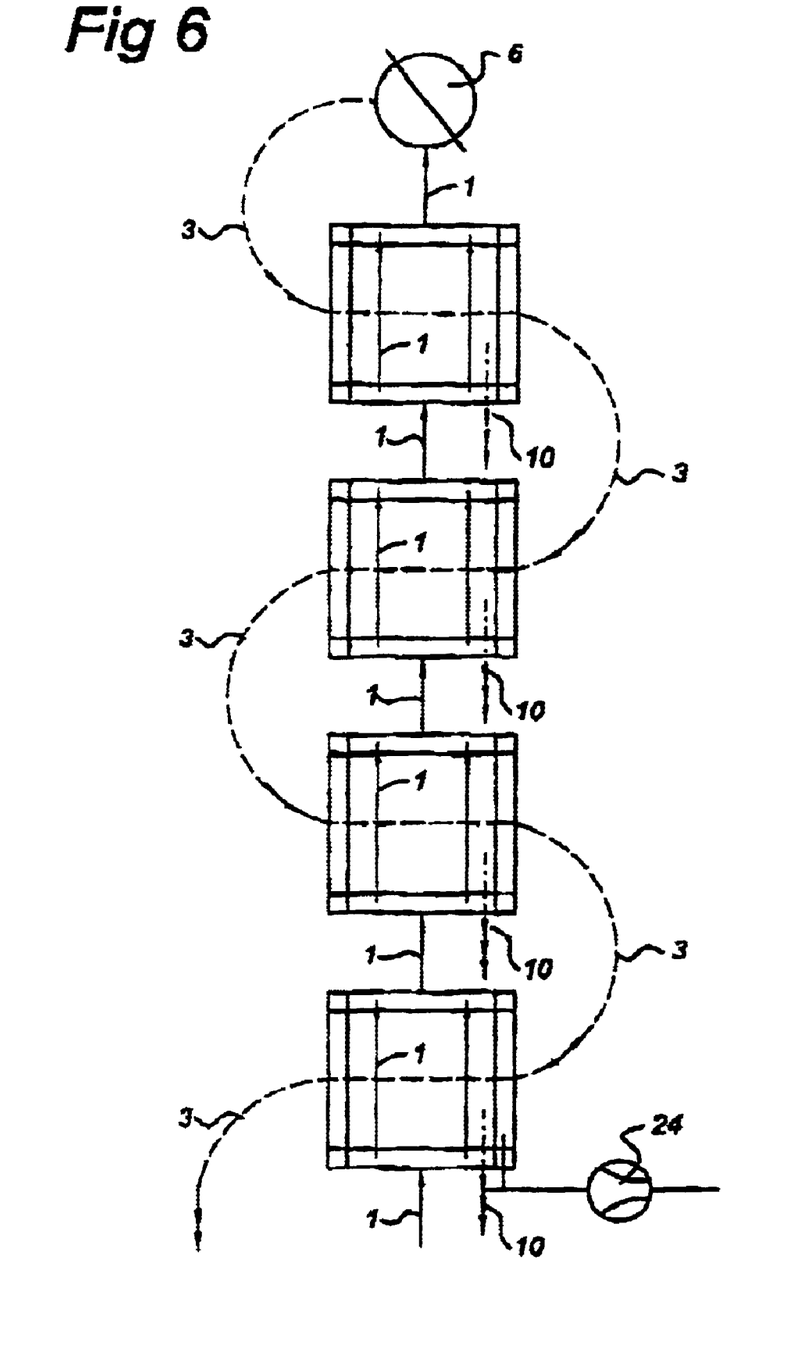
FIG. 6 shows, diagrammatically, a module with which the first embodiment of the method can be carried out.

Each module segment is provided with connecting means (for example snap-fit elements or resin compound), which are not shown, by means of which it can be connected to an adjoining segment such that the feed stream is able to flow from the chamber 18 of the segment to a chamber 17 of a subsequent segment and the retentate steam is able to flow from a chamber 20 of a segment to a chamber 19 of a previous segment (see also FIG. 6).

Depending on the module segment design, the communication openings 16 can be made at locations other than those indicated in FIG. 4. A number of module segments (typically 5 to 20) connected to one another form a module.

FIG. 6, shows, diagrammatically, the various flow paths of the feed stream 1, the retentate stream 3 and the condensate stream 10 when the first embodiment according to FIG. 1 is used. The four module segments which for reasons of clarity are shown separate from one another in FIG. 6 are actually attached to one another. The feed stream (for example seawater) passes through non-porous hollow fibres 21 , the retentate stream 3 (for example brine) through porous hollow fibres 22 and the condensate/distillate/ product stream (for example desalinated water) trickles downwards through the module segments. Viewed over the module as a whole, feed stream 1 and retentate stream 3 are in counter-current to one another (in the drawing the stream 1 moves from bottom to top and the stream 3 from top to bottom). Moreover, in this case the condensate/distillate stream 10 is in counter-current to the feed stream 1 and within each module segment the feed stream 1 and the retentate stream 3 arm in cross-current (angle preferably 90°, can be between 10 and 1701°) to one another. A vacuum pump 24 is connected to the bottom module segment with the aim of lowering the energy consumption by reducing the relative loss of perceptible heat, increasing the mass transfer and providing a possibility for operation under very low driving force ($\Delta T$).

Figure 7:
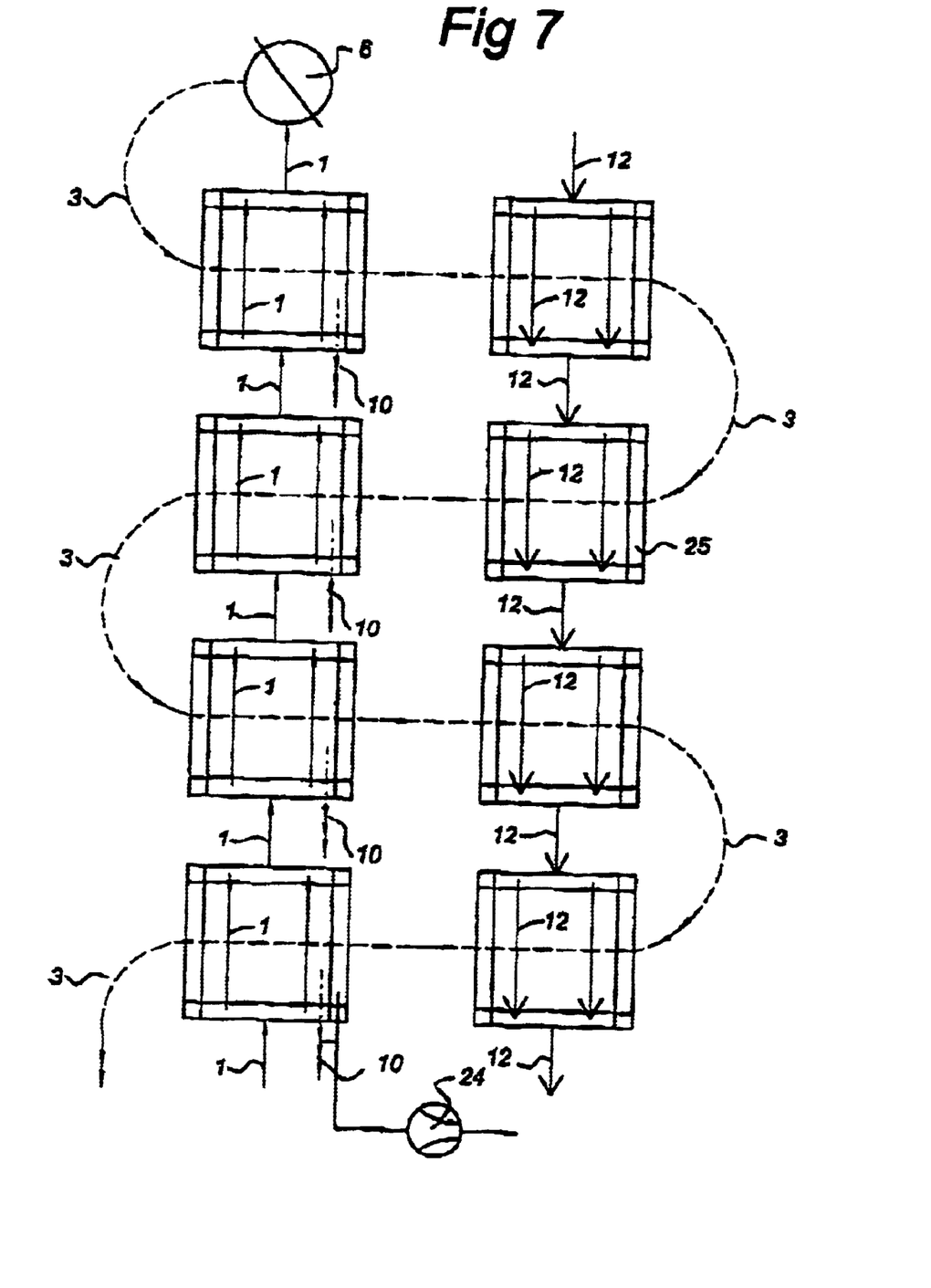
FIG. 7 shows, diagrammatically, a module with which the second embodiment of the method can be carried out.

FIG. 7 differs from FIG. 6 in that the retentate stream is also brought into heat exchange with a stream of residual heat 12 in module segment pans 25. In fact what is concerned here is a further development of a module used in the embodiment according to FIG. 2. In the segment parts 25 non-porous membrane fibres for transport of residual heat and retentate stream cross one another. A module segment part 25 can form an integral whole with a module segment in which the feed stream 1 and the retentate stream 3 are fed in counter-current to one another.

Figure 8:
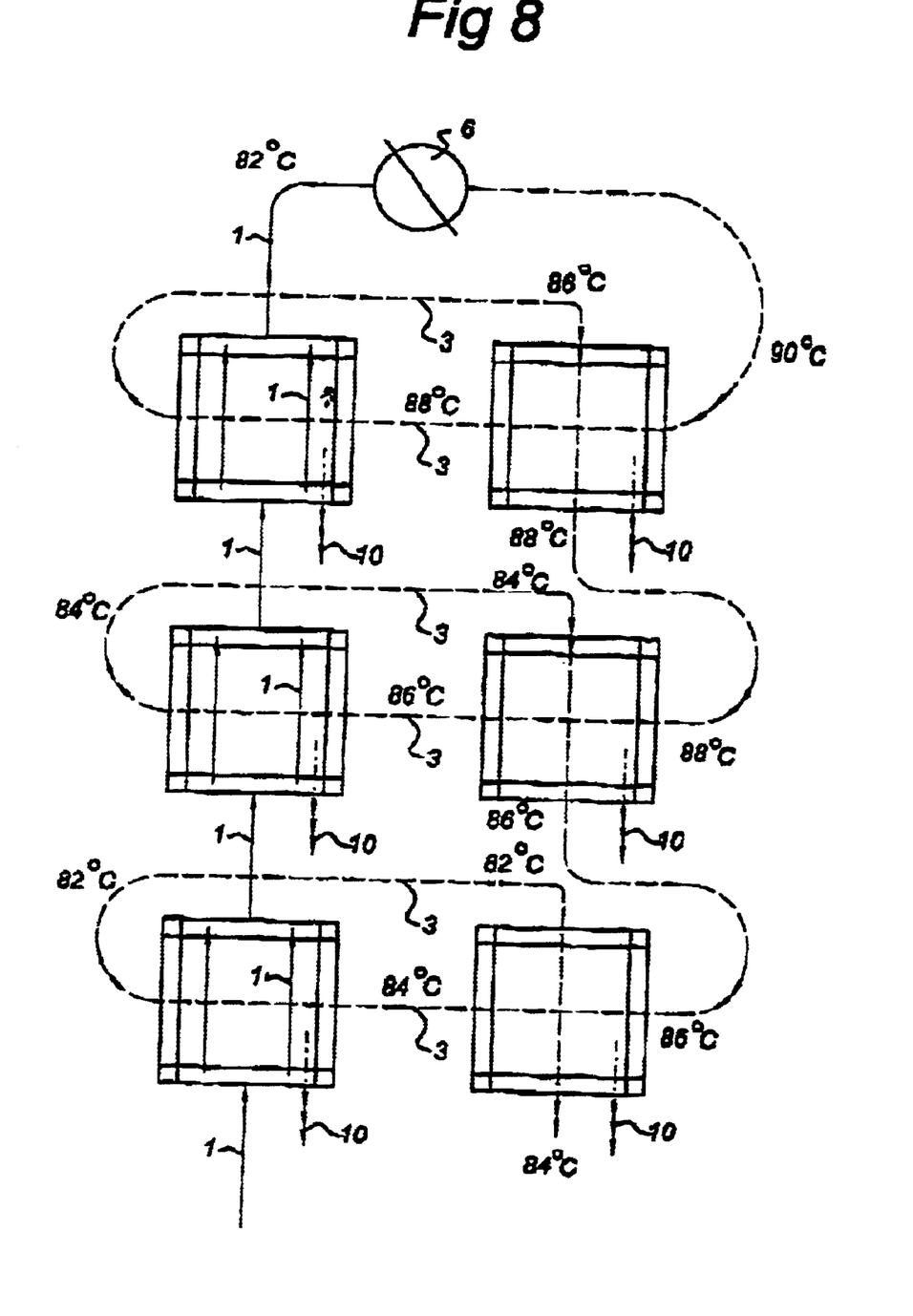
FIG. 8 shows, diagrammatically, a module with which the third embodiment of the method can be carried out.

FIG. 8 is a further development of the flow scheme according to FIG. 3. The retentate stream is in cross-current both with the feed stream and with itself (after having been cooled by heat exchange with feed stream). For clarity, possible temperatures of the retentate are indicated in this figure. A condensate/distillate/product stream 10, for example desalinated water, is obtained both in the module in which a retentate stream and feed stream flow in cross-current to one another and in the module in which retentate stream and retentate stream flow in cross-current to one another.

It has been found that by use of the invention at small vapour pressure differences between vaporising and condensing stream, for example less than 0.1 bar, freshwater can be produced from seawater with a specific energy consumption of less than 200 kJ/kg, that is to say approximately 4–8 times lower than known membrane distillation methods.

The invention is particularly suitable for the desalination of seawater. Existing technologies for this, such as multi-stage flash distillation and inverse osmosis, have been optimised to virtually the maximum extent and because of too high an energy consumption and too high a level of investment per unit product are too expensive compared with on-shore purification production techniques. By use of the invention spectacular results are achieved in respect of a high flow rate, a low heat loss, a very low energy consumption, a high water recovery, good water quality and a breakthrough in water production costs. The method is suitable for use at relatively low temperature (low-grade heat, waste heat, solar heat collectors, etc.). A substantial improvement in energy efficiency is anticipated, especially in the case of small-scale application.

What is claimed is:

1. Method for the purification of a liquid by membrane distillation, comprising:
    passing a relatively warm vaporising stream of liquid (retentate stream (3)) over a porous membrane (4), vapour flowing via the pores of the membrane to the other side of said membrane,
    condensing said vapour on a relatively cool condenser surface (2) to give a distillate/condensing stream (10), said condenser surface forming the non-porous separation between a feed stream (1) to be purified and said distillate stream (10), which feed stream (1) is in counter-current with the retentate stream (3) so that an appreciable proportion of the latent heat will be transferred via vapour to the feed stream (1),
    a gas gap (5) with the width of less than 5 mm being present between the porous membrane (4) and the condenser surface (2),
    a pressure which is lower than the atmospheric pressure and higher than the vapour pressure of the feed stream being maintained in the gas gap (5),
    wherein that the porosity $\epsilon$ of the porous membrane (4) is higher than 0.7, porosity being understood to be the ratio of the open volume to the total volume of the porous membrane 4,
    the surface area of the condenser surface (2) is 1.2 to 6 times the surface area of the porous membrane (4),
    the effective local vapour pressure difference between the retentate stream (3) and the condensing stream (10) is less than 10 kPa (0.1 bar),
    the perceptible heat of the distillate stream (10) is released by heat exchange to the feed stream (1) and/or the retentate stream (3),
    the relationship between the porosity $\epsilon$ of the porous membrane (4), the ratio S between condenser surface area and membrane surface area, the local vapour pressure difference D between retentate and feed in kPa, the width L of the gas gap in cm and the ratio P between the absolute pressure in the gas gap and the local water vapour pressure of the retentate is as follows:

$$\frac{\varepsilon . S^6}{D.L.P^2} > 1$$

the perceptible heat loss of the retentate stream (3) is less than 300 KJ/kg condensate (less than 12% of the latent heat) and the specific flow rate is higher than 0.5 kg condensate/m² membrane/hour/kPa difference in water vapour pressure.

2. Method according to claim 1, wherein use is made of a number of module segments connected to one another and formed by a number of porous retentate channels (22), placed in parallel, which are separated by the said gas gap and the said non-porous membranes from feed stream channels (21) which are positioned at an angle with respect to retentate channels.

3. Method according to claim 2, wherein the said angle between the retentate stream and feed stream channels (22, 21 resp.) is between 10 and 170°.

4. Method according to claim 3, wherein the retentate channels (22) have been made from hydrophobic porous membrane material.

5. Method according to claim 4, wherein the feed stream channels (21) are made of hydrophobic material that is covered or surrounded by hydrophilic material on the condensate distillate discharge side, or are made of hydrophilic material.

6. Method according to claim 5, wherein the width of the gas gap (5) between retentate stream (3) and feed stream channels is determined by the use of a hydrophobic spacer of poor thermal conductivity with a porosity of higher than 70%.

7. Method according to claim 6, wherein the gas gap (5) is filled with inert gas.

8. Method according to claim 2 or 3, wherein the pores of the membrane (4, 22) are larger than 0.1 $\mu$m.

9. Method according to claim 2, wherein the retentate channels (22) have been made from hydrophobic porous membrane material.

10. Method according to claim 2, wherein the feed stream channels (21) are made of hydrophobic material that is covered or surrounded by hydrophilic material on the condensate distillate discharge side.

11. Method according claim 2, wherein the feed stream channels (21) are made of hydrophilic material.

12. Method according to claim 2, wherein the width of the gas gap (5) between retentate stream (3) and feed stream channels is determined by the use of a hydrophobic spacer of poor thermal conductivity with a porosity of higher than 70%.

13. Method according to claim 1, wherein the gas gap (5) is filled with inert gas.

14. Method according to claim 1, wherein an external energy source originating from fossil fuels, solar heat, ground heat, or residual/waste heat, from any of a wide variety of processes, is used in liquid, vapour/gaseous or solid form to supply the driving force for the process.

15. Method according to claim 14, wherein the external energy source is also used for heating the retentate stream (3) cooled by evaporation, the retentate stream (3) being fed alternately in heat exchange with a residual heat stream (12a) and the feed stream.

16. Method according to claim 1, wherein the retentate stream is also brought into heat exchange with a stream (12b) of cooling water, an additional distillate stream being formed.

17. Method according to claim 1, wherein the retentate stream (3) is used, after it has been cooled by discharge of heat of evaporation to the feed stream, as a condenser by feeding the retentate stream (3) through vapour-tight channels in cross-flow with the same retentate stream (3) for cooling, the distillate being formed both by cooling by use of the feed stream and by cooling by use of the retentate stream.

18. The method of claim 1 for the production of desalinated water from sea water or brackish water or process water, wherein said surface area of the condenser surface (2) is 2–3 times said surface area of said porous membrane (4), said effective local vapor pressure difference between the retentate stream (3) and the condensing stream (10) is less than 5 kPa (0.05 bar), said perceptible heat of the distillate stream (10) is released by heat exchange to said retentate stream (3), said specific flow rate is higher than 1.0 kg, and $$\frac{\varepsilon.S^6}{D.L.P^2} > 2.$$

19. The method of claim 18, wherein the width of the gas gap (5) between retentate stream (3) and feed stream channels is determined by the use of a hydrophobic spacer of poor thermal conductivity with a porosity of higher than 90%, and said gas gap (5) is filled with He.

* * * * *